United States Patent [19]

Calvin

[11] 4,054,689

[45] Oct. 18, 1977

[54] METHOD OF PREPARING HYDROPHOBIC SILICA

[75] Inventor: Donald William Calvin, Zachary, La.

[73] Assignee: The Dow Chemical Company, Midland, Mich.

[21] Appl. No.: 730,541

[22] Filed: Oct. 7, 1976

[51] Int. Cl.$^2$ .................. C01B 33/18; C09C 3/00
[52] U.S. Cl. .................. 427/215; 106/288 B; 106/308 B; 423/267; 423/335; 427/255
[58] Field of Search .................. 423/335, 267; 106/288 B, 308 B; 427/215, 255

[56] References Cited

U.S. PATENT DOCUMENTS

| | | | |
|---|---|---|---|
| 2,657,149 | 10/1953 | Iler | 423/335 UX |
| 2,705,206 | 3/1955 | Wagner | 106/308 B X |
| 2,805,958 | 9/1957 | Bueche et al. | 423/335 X |
| 2,973,282 | 2/1961 | Gross | 106/288 B X |
| 3,274,011 | 9/1966 | Duke | 106/288 B X |
| 3,862,307 | 1/1975 | Giulio | 423/335 X |

FOREIGN PATENT DOCUMENTS

| | | | |
|---|---|---|---|
| 1,249,236 | 9/1967 | Germany | 106/308 B |
| 1,951,620 | 6/1973 | Germany | 423/335 |
| 1,110,331 | 4/1968 | United Kingdom | 423/335 |

*Primary Examiner*—Jack Cooper
*Attorney, Agent, or Firm*—Walter J. Lee

[57] ABSTRACT

Amorphous silica is rendered hydrophobic by treating the silica with hydrogen fluoride vapors. The hydrophobic silica thus produced is useful in applications wherein either the sorbed fluoride values are desired or else the hydrophobic properties are desired. The hydrophobic properties are overcome by extended contact with water and the silica then becomes hydrophilic.

7 Claims, No Drawings

METHOD OF PREPARING HYDROPHOBIC SILICA

CROSS-REFERENCE TO RELATED APPLICATION

In my co-filed application Ser. No. 730,556 filed Oct. 7, 1976 titled "Removing Oil From Water," it is shown that a fine-particle hydrophobic silica, identified as a silica containing sorbed fluoride valves, is useful in sorbing oil from water. Such silica, containing sorbed oil, will become hydrophilic after standing for a time on water, thereby releasing from the oil and dropping into the water phase.

BACKGROUND OF THE INVENTION

Fine-particle size silica ($SiO_2$) is a commercialy available and useful product. Fumed, amorphous silica is known to be prepared, e.g., by pyrolyzing silicon halides in processes called vapor phase hydrolysis. When the silicon halide is a silicon chloride, e.g., $SiCl_4$, the fumed silica formed is hydrophilic. When the silicon halide is a silicon fluoride, e.g., $SiF_4$ or $H_2SiF_6$, the fumed silica formed is hydrophobic. Such hydrophobic silica will lose its hydrophobicity and become hydrophilic when in contact with water for extended periods of time.

Among the commercially available fine-particle silicas are those, e.g., bearing the tradenames Syliod, Cab-O-Sil, Zeosyl, Imsil, and Aerosil.

There is a need for methods of converting hydrophilic silica to hydrophobic silica, even silica which had previously been hydrophobic but which has become hydrophilic.

Patents which teach the preparation of fumed silica are, e.g., U.S. Pat. Nos. 3,053,627; 2,819,151; and 3,203,759.

U.S. Pat. No. 2,535, 036, e.g., teaches to react $SiO_2$ with HF to form fluorosilicic acid ($H_2SiF_6$).

U.S. Pat. No. 3,862,307 teaches to treat $SiO_2$ with aqueous HF to acidify the $SiO_2$ and provide fluoride values in dentifrice formulations. It is obvious that when aqueous HF is employed, the $SiO_2$ is prevented from becoming hydrophobic, since the silica is thoroughly wetted throughout the treating step.

It is an object of the present invention to convert hydrophilic silica to hydrophobic silica.

It is another object to return a previously hydrophobic silica to its hydrophobic state after it has lost its hydrophobicity by having been treated with water or with an agent which has neutralized its fluoride values.

Another object is to improve the oleophilic properties of silica by rendering the silica hydrophobic.

These and other objects, which will become apparent to practitioners of the relevant arts, are attained by the present invention.

SUMMARY OF THE INVENTION

Fine-particle silica is treated with HF vapors to render the silica hydrophobic. The treatment is essentially performed in the substantial absence of liquid water, even though water vapor may be present in the HF vapors used in the treatment.

DETAILED DESCRIPTION OF THE INVENTION

Fine-particle silica is treated with vapors of anhydrous HF or by vapors created by passing air or an inert gas through an aqueous solution of HF. vapors emitted from boiling aqueous HF may be employed. It is preferred to employ anhydrous HF, since water, if it is liquid or becomes condensed in the silica, tends to overcome, or retard the formation of, hydrophobic silica. However, water vapor in the HF vapor may be tolerated if one chooses to provide the HF vapor by passing a flow of air or other inert gas through an aqueous solution of HF so long as the water vapor is substantially prevented from condensing in the silica.

The contacting of the HF vapors with the fine particle silica may be done in any manner which provides efficient contact of the HF with the silica. Dropping the silica countercurrently to the HF flow is one way; tumbling the silica in a vessel containing HF vapors is another way. Conveniently, and preferably, the silica is treated in a fluidized bed technique wherein vaporous HF is passed upwardly through a column bed of silica in a manner, and at a rate, which fluidizes the bed, thereby obtaining mobility of the silica particles and assuring substantially complete contact of the HF with the silica.

The temperature at which the anhydrous HF treatment of the silica is done is conveniently, and preferably, an ambient temperature in the range of about 20° C to about 30° C. Higher temperatures may be employed, but for economical and energy-conservation purposes, ambient temperature is preferred. Temperatures below about 19° C should be avoided because of the tendency of anhydrous HF vapors to condense too readily in the silica; temperatures above about 500° C should be avoided because of a tendency to desorb the fluoride values from the silica about as fast as the sorption can occur.

When aqueous solutions of HF are employed, the temperature of the HF/water vapor which is purged out by the use of air or inert gas must be kept at above the dew point of the particular HF/water mixture so as to avoid having water in liquid form in the silica. It will be readily understood that an azeotrope exists at 38% HF and that HF solutions above that concentration will evidentually reach a concentration of 38% when enough HF has been removed. Also, if HF solutions of less than 38% are employed, the azeotropic cencentration will be reached when enough water has been removed. it is preferred that low HF concentrations be avoided, but they may be used if the temperature is held above the dew point at the treating step. A safe temperature at which one may operate, to avoid any condensed water in the silica, is at least about 112° C, the boiling point of the azeotrope.

Alternately, the aqueous HF may be flashed to the silica treating step without the use of a sparging gas. It is important here also to keep the temperature during the treating step at above the dew point of the particular HF/water mixture being used in order to avoid having water in condensed form in the silica.

Any fine-particle silica or powdery silica may be used in the present invention, and it is preferable to employ ultra-fine silica, such as fumed silica, in order that the greatest amount of surface area be exposed to the HF treatment. Other forms of fine-particle silica are suitable, e.g., dry silica gel, colloidal silica (dried and pulverized), and precipitated silica (dried).

The Kirk-Othmer Encyclopedia of Technology provides a good source of background information on silicas, including fine-particle amorphous silicas which are of particular interest for use in the present invention.

Even fumed silica which has been agglomerated to increase its apparent bulk density, but in which the agglomeration step has only slightly reduced the effective surface area of the silica, is quite suitable for use in the present invention.

As mentioned hereinbefore, the silica may be one which was formed initially as a hydrophilic silica or may be one which was formed initially as a hydrophobic silica, but which has lost its hydrophobicity, thereby becoming hydrophilic.

The hydrophobicity is easily determined by placing a sample of the silica on the surface of water. If the silica wets easily and drops down into the water, then its hydrophobicity is either negligible or nil. If it takes from several minutes to several hours to drop down into the water, then it is substantially hydrophobic.

As used throughout this disclosure, the expression "sorbed" is meant to include fluoride values which are retained either physically or chemically by the $SiO_2$, regardless of whether the fluoride values are adsorbed, absorbed, or chemisorbed. There is analytical evidence that at least some of the fluoride values are chemisorbed or reacted onto the silica surface as indicated by the presence of Si-F bonds on the silica.

The amount of sorbed HF values in the silica may be as much as about 2% by weight. One may determine when maximum "loading" has been reached, or at least closely approached, by passing a gaseous stream containing HF through a fluidized bed of silica while testing the effluent gases leaving the silica for fluoride values. When fluoride values are detected leaving the silica bed, the treatment should be stopped so as to avoid wasting the silica. Once the silica is essentially completely loaded, additional contact with excess HF may cause formation and emission of $SiF_4$ and/or $H_2SIF_6$ (as well as excess HF), depending on the temperature and presence of water. Such formation and emitting of $SiF_4$ and/or $H_2SiF_6$ would be counterproductive if one desires hydrophobic silica as the end result.

Various analytical techniques may be employed to detect the presence of fluoride values in the gas stream leaving the silica treatment step in order to determine if essentially complete loading has occured. A very convenient method is to use an acid-sensitive "rag" or paper which undergoes a color change when contacted with acidic fluorine values.

Throughout this disclosure, the term "hydrophobic" means that the silica is not readily wetted by water, but is apparently oleophilic and readily absorbs oils such as aliphatic hydrocarbons. One of the presently proposed uses of hydrophobic silica is to sorb oil from the surface of water, thereby forming a flaky mixture of oil and silica which is readily separated from the water. The silica may then be separated from the oil by placing the mixture of oil and silica on water and allowing it to stand for a number of hours, during which time the silica loses its hydrophobicity and enters the water, leaving the oil floating on top. Silica which has lost its hydrophobicity and becomes waterwettable is considered herein to be hydrophilic.

The minimum extent to which the silica should be treated to acquire hydrophobic properties is determinable by placing the silica in water to see if it wets readily. Ordinarily, silica which has less than about 400–500 ppm fluorine values will wet fairly rapidly, thus the degree of hydrophobicity at that level of loading is very slight or nil. As the level of loading is increased, the degree of hydrophobicity is increased. At about 600–700 ppm fluorine loading the silica exhibits a markedly greater degree of hydrophobicity that the 400–500 ppm level and the invention can be seen to be operable over the range of about 600 ppm to about 2%. The preferred loading is in the range of about 0.5 to about 2.0%; the most preferred range to give a high degree of hydrophobicity is about 1.0 to 2.0% loading. It will be understood that the apparent hydrophobicity of the silica will be affected by the uniformity of the sorbed fluorine values throughout the silica. For best results the silica should be tumbled, stirred, fluidized or otherwise moved about when being contacted with the HF in order to approach or attain uniform contact throughout.

The following examples are illustrative of the practice of the invention, but the invention is not limited to the specific illustration given.

EXAMPLE 1

Fumed silica (hydrophilic) is placed in a vertical column. Air is bubbled through a relatively large supply of 52% solution of HF and upwardly through the silica, thereby fluidizing the fumed silica. The temperature is above that at which the entrained water vapor will substantially condense. Air flow is continued until an acid sensitive rag shows a color change at the bed exit indicating escape of unreacted acid fumes. The silica product is found to contain 2% fluoride by weight and is found to exhibit a hydrophobic nature. The hydrophobic silica is found to sorb oil from the surface of water, thereby forming a flaky-appearing material which floats on water.

EXAMPLE 2

In similar manner to Example 1, gaseous HF is passed upwardly through a bed of hydrophilic fumed silica at a rate sufficient to fluidize the bed. When the flow rate of HF leaving the bed is found to be about equal to the flow rate of HF being fed to the bed, the flow is terminated.

The silica is found to contain about 2% by wt. fluoride values and is found to be hydrophobic.

Other methods for contacting the silica with the HF vapor may be employed, such as dropping the silica through a contacting zone which contains HF vapor such as by passing gaseous HF through a tumbling bed of silica. Another way is to place the silica in a vessel, evacuate the air from the vessel, and backfill the reduced pressure with gaseous HF. Other methods will become apparent to practitioners of the present invention, having learned of it from this disclosure, but it is believed that the most efficient method is that of using a fluidized bed technique as described above.

I claim:

1. A method of causing fine-particle silica to be hydrophobic, said method comprising
   providing a supply of substantially dry, fine-particle silica which is not hydrophobic and a supply of gaseous anhydrous HF or a gaseous HF stream containing water vapor,
   contacting the silica, in the substantial absence of liquid water, with the gaseous anhydrous HF or gaseous HF stream containing water vapor at a temperature above the dew point of the HF and the water vapor, when water vapor is present
   continuing said contacting until the amount of fluorine values sorbed by the silica is in the range of about 0.06 to about 2% by weight.

discontinuing the supply of HF vapor being supplied to the silica, and recovering the so-formed hydrophobic silica.

2. The method of claim 1 wherein the fine-particle silica is fumed silica.

3. The method of claim 1 wherein the gaseous HF supply is provided by being carried in an inert gaseous carrier.

4. The method of claim 3 wherein the inert gaseous carrier is air.

5. The method of claim 1 wherein said silica is contacted with the gaseous HF stream containing water vapor.

6. The method of claim 1 wherein the amount of fluorine values sorbed by the silica is in the range of about 0.5 to about 2.0% by weight.

7. The method of claim 1 wherein the temperature is within the range of about 20° to about 30° C when a gaseous anhydrous HF stream is used and within the range of about 112° to about 500° C when a gaseous HF stream containing water vapor is used.

* * * * *